(12) United States Patent
Hidaka

(10) Patent No.: US 8,611,899 B2
(45) Date of Patent: Dec. 17, 2013

(54) BASE STATION APPARATUS, WIRELESS COMMUNICATION TERMINAL APPARATUS, COMMUNICATION METHOD AND COMPUTER READABLE MEDIUM THEREOF

(75) Inventor: Hiroyuki Hidaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 125 days.

(21) Appl. No.: 11/574,505

(22) PCT Filed: Aug. 30, 2005

(86) PCT No.: PCT/JP2005/015757
§ 371 (c)(1),
(2), (4) Date: Sep. 10, 2009

(87) PCT Pub. No.: WO2006/025379
PCT Pub. Date: Mar. 9, 2006

(65) Prior Publication Data
US 2010/0062769 A1    Mar. 11, 2010

(30) Foreign Application Priority Data
Aug. 31, 2004 (JP) .............................. P.2004-252266

(51) Int. Cl.
*H04W 36/00* (2009.01)

(52) U.S. Cl.
USPC ........... 455/436; 455/437; 455/438; 455/442; 455/525

(58) Field of Classification Search
USPC ........................ 455/436, 437, 442, 438, 525
See application file for complete search history.

(56) References Cited

U.S. PATENT DOCUMENTS

| 6,430,414 | B1 * | 8/2002 | Sorokine et al. ............... 455/442 |
| 6,792,284 | B1 * | 9/2004 | Dalsgaard et al. ............. 455/525 |
| 7,373,148 | B2 * | 5/2008 | Kim et al. ...................... 455/437 |
| 7,450,545 | B2 | 11/2008 | Kim et al. |
| 8,126,127 | B2 * | 2/2012 | Hsu et al. .................. 379/201.05 |
| 2003/0036384 | A1 | 2/2003 | Chen et al. |
| 2003/0134640 | A1 * | 7/2003 | Kim et al. ...................... 455/438 |
| 2003/0231612 | A1 | 12/2003 | Kim et al. |
| 2005/0101328 | A1 * | 5/2005 | Son et al. ...................... 455/436 |

FOREIGN PATENT DOCUMENTS

| CN | 1496041 A | 5/2004 |
| EP | 1 326 462 | 7/2003 |
| EP | 1 372 350 | 12/2003 |
| EP | 1372350 A1 | 12/2003 |
| EP | 1 467 586 | 10/2004 |
| JP | 2002-171555 | 6/2002 |
| KR | 20030096090 A | 12/2003 |
| WO | 03/017713 | 2/2003 |

OTHER PUBLICATIONS

Korean language office action for corresponding Korean application 10-2007-7004868.
Chinese language office action and its English language translation for corresponding Chinese application 200580029092.5.

* cited by examiner

*Primary Examiner* — David Q Nguyen
(74) *Attorney, Agent, or Firm* — DLA Piper LLP (US)

(57) ABSTRACT

A base station used in a communication system including the base station for broadcasting service information to a wireless communication terminal, and the wireless communication terminal for receiving the service information during an idle state, the base station includes: a storing section for storing information of other base stations existing nearby the base station and service compliant information indicative of whether the other base stations are compliant with transmission of the service information.

16 Claims, 9 Drawing Sheets

FIG. 4

General NeighborList Message

| Field | | value |
|---|---|---|
| NUM_NGHBR | | 6 |
| 0 | NGHBR_CONFIG | 0 |
| | NGHBR_PN | 204 |
| | SEARCH_PRIORITY | 4 |
| | SRCH_WIN_NGHBR | 60 |
| | FREQ_INCL | 1 |
| | NGHBR_BAND | 3 |
| | NGHBR_FREQ | 76 |
| | TIMING_INCL | 1 |
| | NGHBR_TX_OFFSET | 0 |
| | NGHBR_TX_DURATION | 0 |
| | NGHBR_TX_PERIOD | 0 |
| | NGHBR_CONFIG | 0 |
| | SERVICE_INCL | 1 |
| | NGHBR_SERVICE | 0000111 |
| 1 | NGHBR_CONFIG | 0 |
| | NGHBR_PN | 208 |
| | SEARCH_PRIORITY | 3 |
| | SRCH_WIN_NGHBR | 60 |
| | FREQ_INCL | 1 |
| | NGHBR_BAND | 3 |
| | NGHBR_FREQ | 76 |
| | TIMING_INCL | 1 |
| | NGHBR_TX_OFFSET | 0 |
| | NGHBR_TX_DURATION | 0 |
| | NGHBR_TX_PERIOD | 0 |
| | NGHBR_CONFIG | 0 |
| | SERVICE_INCL | 1 |
| | NGHBR_SERVICE | 0000111 |

BASE STATION B (rows for index 0)
BASE STATION C (rows for index 1)

Neibor[i] LIST

| No. | PN | Channel | Service |
|---|---|---|---|
| 0 | 200 | 76 | 0000111 |
| 1 | 204 | 76 | 0000111 |
| 2 | 208 | 76 | 0000111 |
| 3 | 212 | 76 | 0000111 |
| 4 | 216 | 76 | 0000000 |
| 5 | 220 | 76 | 0000000 |
| 6 | 224 | 76 | 0000000 |
| ... | ... | ... | ... |

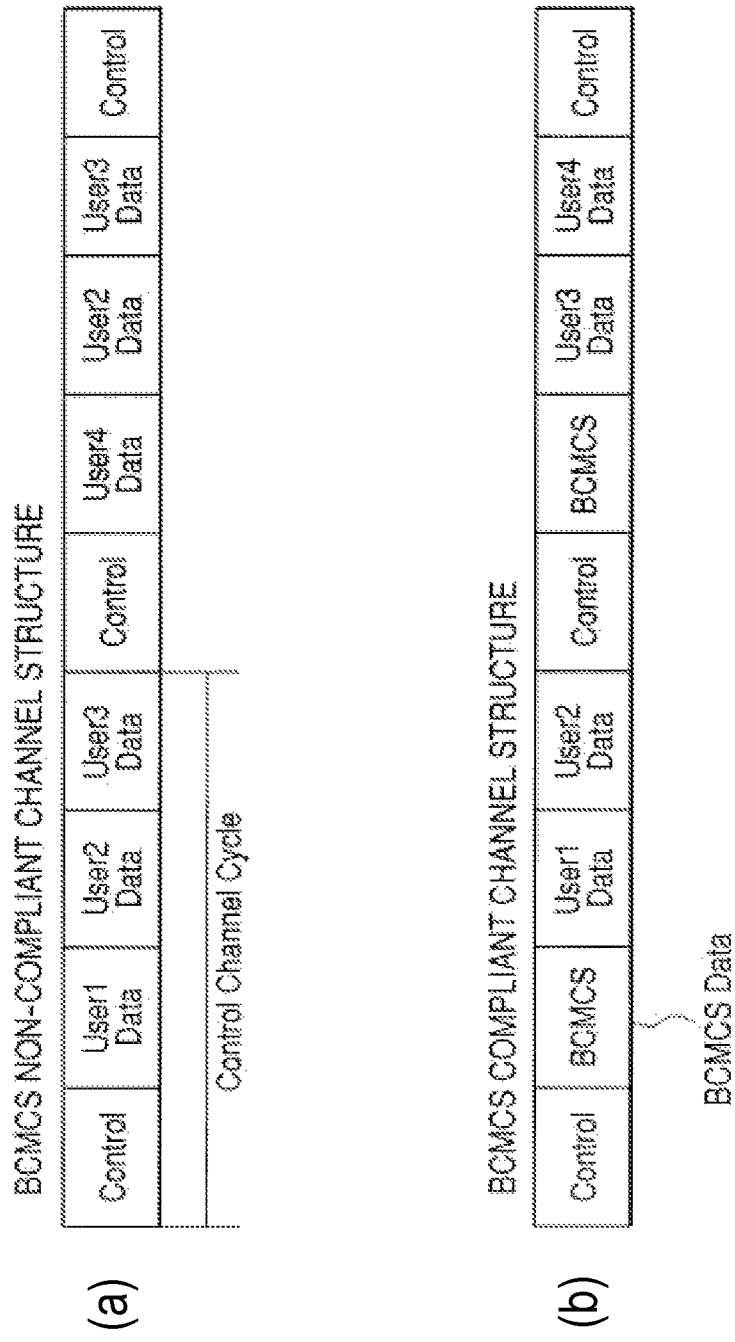

FIG. 10

General NeighborList Message

| | Field | value | |
|---|---|---|---|
| | NUM_NGHBR | 6 | |
| 0 | NGHBR_CONFIG | 0 | BASE STATION B |
| | NGHBR_PN | 204 | |
| | SEARCH_PRIORITY | 4 | |
| | SRCH_WIN_NGHBR | 60 | |
| | FREQ_INCL | 1 | |
| | NGHBR_BAND | 3 | |
| | NGHBR_FREQ | 76 | |
| | TIMING_INCL | 1 | |
| | NGHBR_TX_OFFSET | 0 | |
| | NGHBR_TX_DURATION | 0 | |
| | NGHBR_TX_PERIOD | 0 | |
| | NGHBR_CONFIG | 0 | |
| 1 | NGHBR_CONFIG | 0 | BASE STATION C |
| | NGHBR_PN | 208 | |
| | SEARCH_PRIORITY | 3 | |
| | SRCH_WIN_NGHBR | 60 | |
| | FREQ_INCL | 1 | |
| | NGHBR_BAND | 3 | |
| | NGHBR_FREQ | 76 | |
| | TIMING_INCL | 1 | |
| | NGHBR_TX_OFFSET | 0 | |
| | NGHBR_TX_DURATION | 0 | |
| | NGHBR_TX_PERIOD | 0 | |
| | NGHBR_CONFIG | 0 | |

BASE STATION APPARATUS, WIRELESS COMMUNICATION TERMINAL APPARATUS, COMMUNICATION METHOD AND COMPUTER READABLE MEDIUM THEREOF

TECHNICAL FIELD

The present invention relates to a wireless communication system, and more particularly to a technique for preventing a service interruption due to a handoff.

BACKGROUND ART

In a portable telephone system, in order to constantly ensure an optimum communication environment for wireless communication terminal that continues communication while its position is moved, a process for switching a base station (hereinafter, referred to as a handoff) to be connected is performed depending on a radio wave condition with the wireless communication terminal.

The wireless communication terminal measures both strength of a signal transmitted from the base station under communication and strength of a signal transmitted from other peripheral base stations other than that base station to carry out a process for maintaining more suitable radio state.

For instance, in the case of a CDMA portable telephone of an IS95 system (CDMA2000 1x system), the portable telephone measures a signal strength from a base station with which the portable telephone currently communicates and a signal strength from peripheral base stations other than that base station.

Then, the portable telephone informs the base station of the measured signal strength while the portable telephone is under communication, and entrusts the base station to determine the handoff.

Further, during the idle state of the portable telephone, the terminal itself determines to switch the base station based on the measured result (for instance, see Patent Document 1).
Patent Document 1: JP-A-2002-171555

DISCLOSURE OF THE INVENTION

Problems that the Invention is to Solve

However, in the above-described usual handoff system, the handoff is determined depending on the radio wave state of the base stations in the periphery of the terminal. Thus, when a user uses an information service provided only in a specific base station group (area), the user needs to consider an information service providing area at the time of the handoff to continuously use the information service across the area.

The information service includes, for instance, a broadcast service or a multicast service. The broadcast service is a new service mode in which a base station apparatus continuously transmits data in a connectionless form to all wireless communication terminal apparatuses in a service area of the base station itself by using a radio communication network, that is, the base station apparatus "broadcasts".

Further, the multicast service is, in association with the broadcast service, a service mode in which broadcasting is performed so that only a specific user who makes a contract with specific service information (for instance, charged service information) among wireless communication terminal apparatuses in a service area can listen to and view the service information.

The forms of the data transmitted by the broadcast service or the multicast service specifically includes character information, audio/music information or streaming video information or the like. In this specification, these information are referred to as "service information".

A user activates a prescribed communication program for using the service information or selects a prescribed mode for receiving the service information. This allows the user to select, receive, and listen to/view the service information which the user desires to receive when the wireless communication terminal apparatus in an idle state enters the service area of the broadcast service or the multicast service.

The user having the wireless communication terminal apparatus in an idle state enters the service area in which the service information is broadcast, and then the user can receive and view and listen to the service information by the wireless communication terminal apparatus.

However, in the new service such as the broadcast service, all the base station apparatuses are not necessarily compliant with the new service at the time of starting the service.

Further, new channels are anticipated to appear one after another, and all the base stations are not necessarily compliant with a newly provided channel.

Consequently, a situation arises that compliant services are different depending on the base stations.

In a related art, peripheral base station information notified from a base station includes information necessary for receiving a radio signal from a peripheral base station.

For instance, in the case of a portable telephone system of the IS95 system (CDMA2000 1x system), the peripheral base station information notified from the base station includes, as shown in FIG. 10, a radio class (NGHBR-BAND), a frequency (NGHBR-FREQ), operation reference time information of the base station (NGHBR-PN, NGHBR-TX-OFFSET, . . . ), etc. These information are sufficient to measure the strength of the radio signal from the base station and perform a handoff. However, the information does not include information as to whether the peripheral base station is compliant with the broadcasting of the service information.

Accordingly, it can not be determined whether the same service as a current service can be continued even in a base station to which the handoff is carried out.

For instance, cells formed by the base stations of the portable telephone system are adjacently provided (or partly overlapped) as shown in FIG. 11.

At this time, as shown in FIG. 12, when the same service is provided in all the base stations (cells), the wireless communication terminal can receive the same service as the current service when the wireless communication terminal moves to any of the cells.

However, as shown in FIG. 13, when the broadcast service is provided in some cells (A to D), and the broadcast service is not provided in other parts of the cells (E to G), if a mobile communication terminal that receives the broadcast service makes handoff to the cells E to G, the mobile communication terminal can no longer receive the broadcast service.

That is, in the related art, since the handoff during an idle state is performed based on only the measured signal strength from the peripheral base station, if the handoff to the base station that does not provide the service information is performed while the service information that can be employed even during the idle state is being received, the service may be sometimes interrupted.

To summarize the problem of the present invention, while the broadcast service or the multicast service is received in the idle state, the handoff to the base station that is not compliant with the broadcast service may be performed. As a result, a problem arises that the broadcast service that was being received can no longer be received.

Means for Solving the Problems

A first invention relates to a base station used in a communication system including the base station for broadcasting service information to a wireless communication terminal, and the wireless communication terminal for receiving the service information during an idle state, the base station comprising:

a storing section for storing information of other base stations existing nearby the base station and service compliant information indicative of whether the other base stations are compliant with transmission of the service information.

In the first invention, a second invention further comprising:

a transmitting section for transmitting the information of the other base stations and the service compliant information which are stored in the storing section, to the wireless communication terminal.

A third invention is related to a wireless communication terminal, comprising:

a receiving section for, during an idle state, receiving service information that is broadcast to the wireless communication terminal from a base station, and receiving from the base station information of other base stations existing nearby and service compliant information indicative of whether the other base stations are compliant with the service information; and a control section for specifying a base station that is compliant with the service information from the other base stations based on the service compliant information.

In a fourth invention in the third invention, the receiving section receives the service information together with identification information that identifies the service information, and the control section specifies the base station that is compliant with the service information from the other base stations based on the identification information and the service compliant information.

In a fifth invention in the third or fourth invention, the control section detects a communication quality between the wireless communication terminal and the base station and a communication quality between the wireless communication terminal and the specified base station, specifies a handoff candidate base station based on the detected result, determines whether a handoff to the base station that is specified as the handoff candidate needs to be performed, and when the control section determines that the handoff is necessary, the control section performs the handoff to the base station that is specified as the handoff candidate.

In a sixth invention in the third to fifth inventions, the control section detects only a communication quality between the wireless communication terminal and the base station that is specified to be compliant with the service information.

A seventh invention is related to a communication method in a communication system including a base station and a wireless communication terminal for transmitting and receiving data with the base station through a radio communication network, wherein the base station broadcasts service information to the wireless communication terminal, the wireless communication terminal receives the service information during an idle state, the base station transmits information of at least one other base station existing nearby the base station and service compliant information indicative of whether the other base station is compliant with broadcasting of the service information, to the wireless communication terminal, and the wireless communication terminal receives the service compliant information together with the information of the other base station while continuously receiving the service information, and specifies a base station that is compliant with the receiving service information from the other base station based on the received service compliant information.

An eighth invention is related to a computer readable medium having a program that allows a wireless communication terminal that includes a transmitting and receiving section for transmitting and receiving data with a base station through a radio communication network and a control section for controlling the transmission and reception of the data by the transmitting and receiving section, to perform instructions comprising:

receiving service information that is broadcast to the wireless communication terminal from the base station during an idle state;

receiving information of other base stations existing nearby the base station and service compliant information indicative of whether the other base stations are compliant with transmission of the service information, which are transmitted by the base station, while receiving the service information; and specifying a base station that is compliant with the service information from the other base stations based on the received service compliant information.

In a ninth invention in the eighth invention, the computer readable medium having the program that allows the wireless communication terminal to perform the instructions, the service information is received together with identification information that identifies the service information from a plurality of service information; and the base station that is compliant with the service information is specified from the other base stations based on the identification information and the service compliant information.

In a tenth invention in the eighth or ninth invention, the computer readable medium having the program that allows the wireless communication terminal to perform the instructions further comprising:

detecting a communication quality between the wireless communication terminal and the base station and a communication quality between the wireless communication terminal and the specified base station;

specifying a handoff candidate base station based on the detected result;

determining whether a handoff to the specified base station needs to be performed; and performing the handoff to the specified base station when it is determined that the handoff is necessary.

In a eleventh invention in the eighth to tenth invention, the computer readable medium having the program that allows the wireless communication terminal to perform the instructions further comprising:

detecting only a communication quality between the wireless communication terminal and the base station that is specified to be compliant with the service information.

Advantage of the Invention

In the present invention, information indicating service information provided by the peripheral base station is included in the peripheral base station information that is notified from the base station.

Then, the peripheral base station as a handoff candidate is selected on the basis of the notified information and the service used by the terminal.

That is, the wireless communication terminal can know the service information that the peripheral wireless base station is compliant with before the handoff is carried out, and the handoff can be carried out only to the peripheral base station that is compliant with the service information. Accordingly, the interruption of a service due to the handoff can be avoided.

Further, since the peripheral base station capable of performing the handoff is limited, a searching time of the peripheral base station can be shortened, a required processing load can be reduced and a consumed electric power can be reduced.

BRIEF DESCRIPTION OF THE DRAWINGS

FIG. 4 is an information format of peripheral base station information of an embodiment of the present invention.

FIG. 9 is an explanatory view of a channel structure in a TDMA system.

FIG. 10 is an information format of peripheral base station information of a related art mode.

Figure 1:
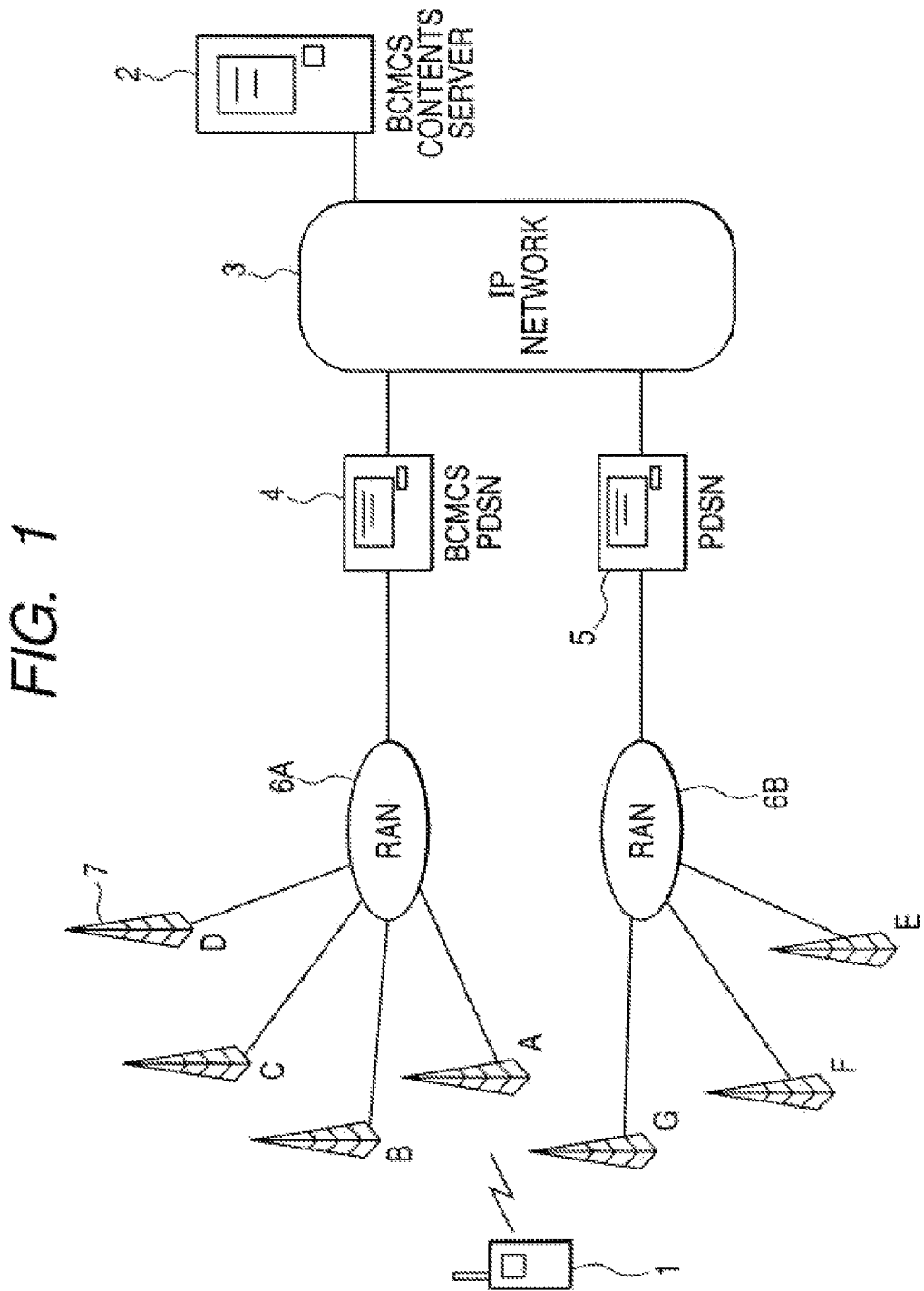
FIG. 1 is a block diagram of a mobile communication system of an embodiment of the present invention.

DESCRIPTION OF REFERENCE NUMERALS AND SIGNS 1 wireless communication terminal
2 server
3 network
4 BCMCS PDSN
5 PDSN
6 RAN
7 wireless base station

BEST MODE FOR CARRYING OUT THE INVENTION

Now, an embodiment of the present invention will be described below by referring to the drawings.

The embodiment described below is obtained by applying the present invention to an IS95 system (CDMA2000 1x system).

FIG. 1 is a block diagram of a mobile communication system of the present invention.

A broadcast/multicast contents server 2 is connected to a PDSN (Packet Data Service Node) 4 through an IP network 3.

The broadcast/multicast PDSN 4 is connected to wireless base stations (A to D) 7 through a RAN 6A.

The PDSN 4 is a packet data processing node and the RAN 6A is a network in a wireless system.

Further, the broadcast/multicast contents server 2 is connected to a broadcast/multicast non-compliant PDSN 5 through the IP network 3.

The broadcast/multicast non-compliant PDSN 5 is connected to wireless base stations (E to G) 7 through a RAN 6B.

These wireless base stations (A to G) 7 communicate with a wireless communication terminal 1 located in a communication area.

That is, the wireless base stations A to D provide a broadcast/multicast service, and the wireless base stations E to G do not provide the broadcast/multicast service.

Figure 13:
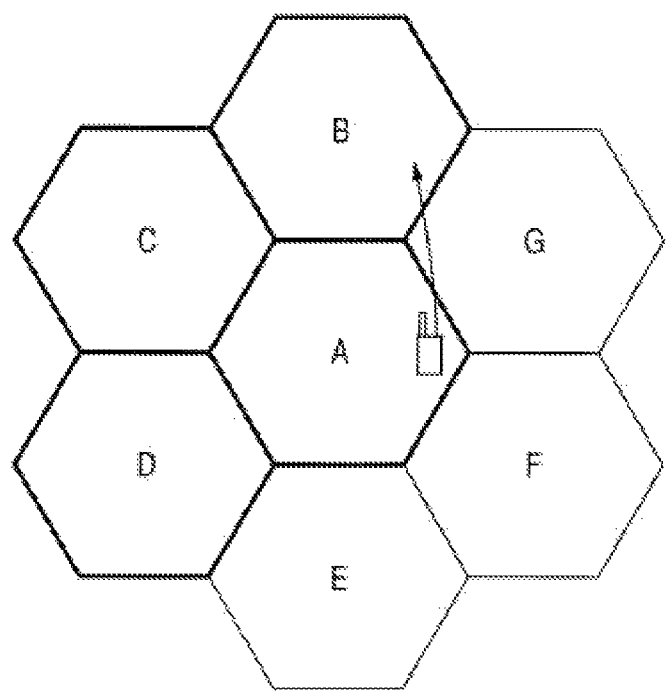
FIG. 13 is an explanatory view of cells formed by base stations of a portable telephone system.

At this time, the area formed by the wireless base stations 7 is shown in FIG. 13.

Referring to an area diagram shown in FIG. 13, the wireless base stations A to D continuously transmit, that is, broadcast the service information of the broadcast service to all wireless communication terminals located in service areas in a connectionless form by using cells respectively as the service areas. Further, the wireless base stations A to D transmit, that is, broadcast the service information of the multicast service in a connectionless form so that only a specific user who makes a contract with specific service information (for instance, charged service information) in wireless communication terminals respectively located in the service areas can listen to and view the service information.

The information service includes, for instance, the broadcast service or the multicast service. The broadcast service is a new service mode in which a base station apparatus continuously transmits data in a connectionless form to all wireless communication terminal apparatuses in service areas of the base station itself by using a radio communication network, that is, the base station apparatus "broadcasts".

Further, the multicast service is, in association with the broadcast service, a service mode in which data is broadcast so that only a specific user who makes a contract with specific service information (for instance, charged service information) among wireless communication terminal apparatuses in service areas can listen to and view the service information.

The forms of the data transmitted by the broadcast service or the multicast service includes character information, audio/music information or streaming video information or the like. In this specification, these information are referred to as "service information".

A user activates a prescribed communication program for using the service information or selects a prescribed mode for receiving the service information. This allows the user to select, receive, and listen to/view the service information which the user desires to receive when the wireless communication terminal apparatus in an idle state enters the service area of the broadcast service or the multicast service.

The user having the wireless communication terminal apparatus in an idle state enters the service area in which the service information is broadcast, and then the user can receive and view and listen to the service information by the wireless communication terminal apparatus.

In the broadcast service, the wireless communication terminal apparatus side one-sidedly receives the data transmitted from the wireless base station without establishing a connection between the wireless communication terminal apparatus and the wireless base station.

Now, a channel structure in a CDMA system employed in the IS-95 system (CDMA2000 1x system) when the broadcast service is realized will be described below.

Figures 7, 8:
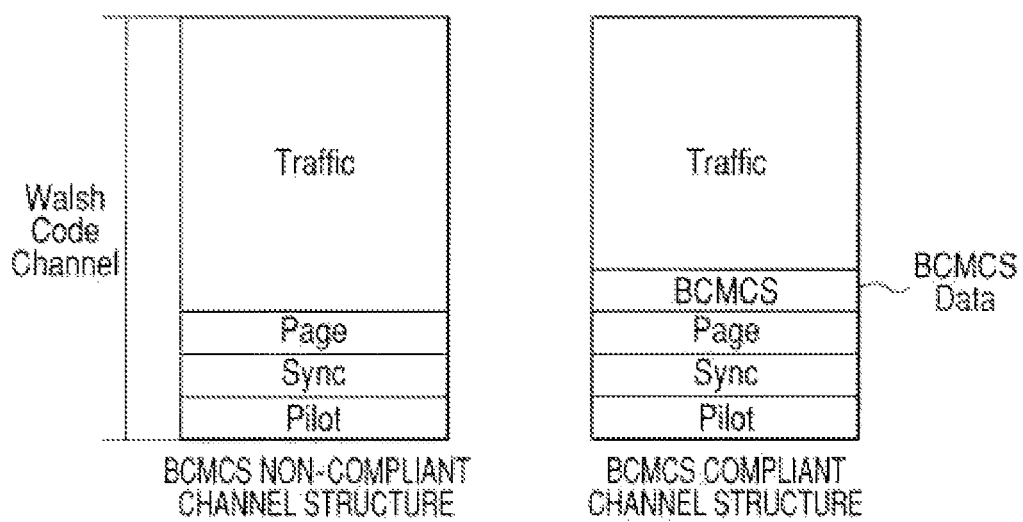
FIG. 7 is an explanatory view of a peripheral base station search list stored in the wireless communication terminal of an embodiment of the present invention.
FIG. 8 is an explanatory view of a channel structure in a CDMA system.
Figure 11:
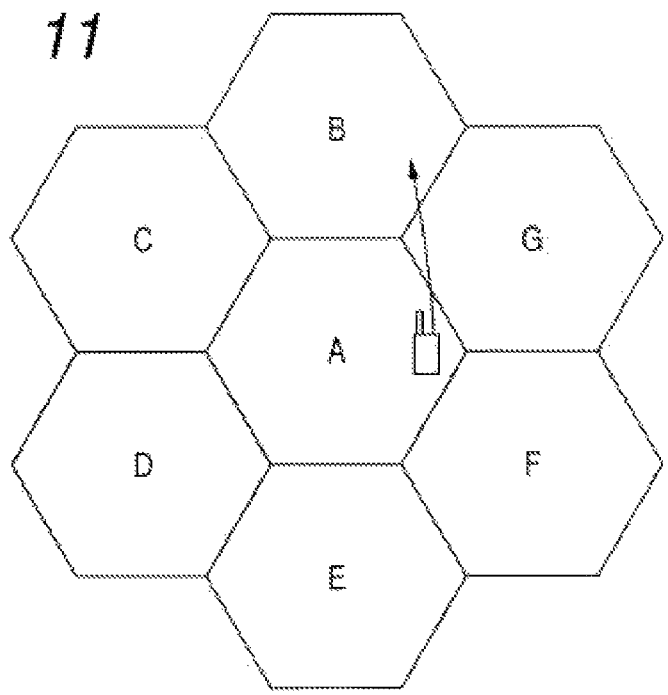
FIG. 11 is an explanatory view of cells formed by base stations of a portable telephone system.
Figure 12:
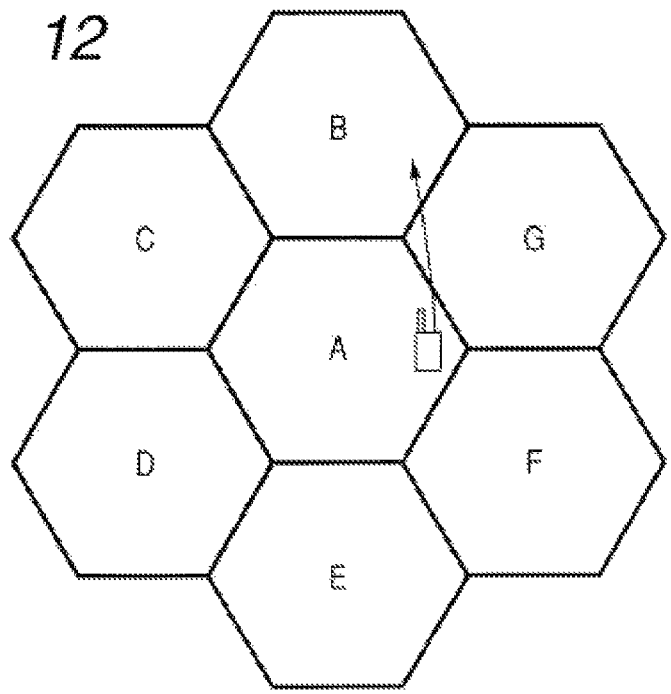
FIG. 12 is an explanatory view of cells formed by base stations of a portable telephone system.

FIG. 8 shows the channel structure in the CDMA (code division multiplex) system.

In the CDMA system, control channels (Pilot, Sync, Page) for transmitting the information of the wireless base station are allocated. A channel (BCMCS) for the broadcast service is allocated subsequent to these channels.

In the wireless communication terminal apparatus side, when the communication program for the broadcast is activated, the BCMCS is received synchronously with the timing of receiving the control channels. Thus, even during an idle state, the BCMCS can be always received to receive the provision of the broadcast service.

As the specific forms of the service information of the broadcast service, exemplified are the "video information" such as a television broadcast or streaming, the "audio/music information" such as a radio broadcast, the "character information" such as a news board, etc.

FIG. 9 shows a channel structure in a TDMA (time-division multiplex) system as another example.

In the TDMA system, since a FORWARDLINK is time-divided, the channel (BCMCS) for the broadcast service can be allocated in one time slot (for instance, a channel adjacent to the control channel).

In the wireless communication terminal apparatus side, when an application for the broadcast is activated, the BCMCS is received synchronously with the timing of receiving the control channel.

Thus, even during an idle state, the BCMCS can be always received to receive the provision of the broadcast service.

Figure 2:
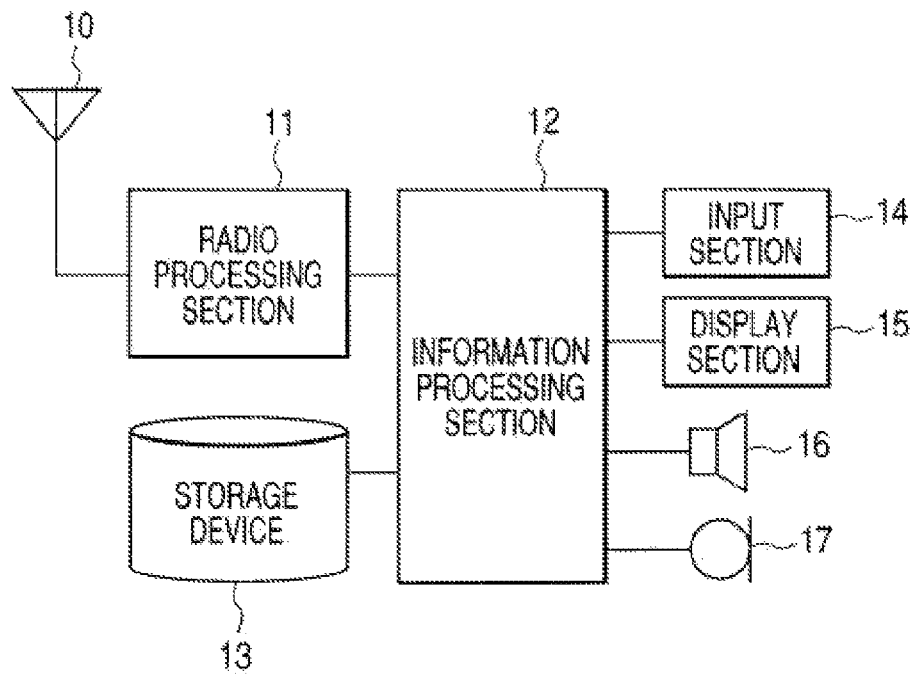
FIG. 2 is a block diagram showing a structure of a wireless communication terminal of an embodiment of the present invention.

FIG. 2 is a block diagram showing a structure of a wireless communication terminal 1 of an embodiment of the present invention.

The wireless communication terminal 1 of this embodiment is compliant with a broadcast data communication and a multicast data communication as well as an ordinary audio communication and a data communication.

An antenna 10 is connected to a radio processing section 11 to receive a radio wave from the wireless base station 7 and transmit a radio wave to the wireless base station 7. The radio processing section 11 carries out transmitting and receiving processes in accordance with the IS-95 system (CDMA2000 1x system).

The radio processing section includes a transmitting section for generating a high frequency signal transmitted from the antenna 10 and a receiving section for amplifying the high frequency signal and performing frequency-conversion to output the signal to an information processing section 12 as a base-band signal.

The information processing section 12 includes a base-band section and a radio control section. The base-band section demodulates the base-band signal to a digital signal by a codec section in the base-band section. Also, the codec section modulates the digital signal to generate a base-band signal The radio control section executes a program stored in a storage device 13 to control an operation of a communication function or process various services employing a wireless communication.

Specifically, the radio control section controls the reception of data in the broadcast service and the multicast service.

Further, the radio control section controls the frequency, a transmitting and receiving timing or the output of the transmitted radio wave, which are transmitted and received by the radio processing section 11.

Further, the radio control section selects the wireless base station of the other side of communication to control a handoff for switching the wireless base station.

The handoff includes the handoff during a call and the handoff during an idle state (idle handoff).

During the idle state, the wireless communication terminal 1 constantly receives control information transmitted by the control channel from the wireless base station 7 at intervals of a prescribed time. A radio wave from a peripheral base station is received and a communication quality is examined on the basis of peripheral base station information included in the control information.

As a result, when there is a wireless base station whose communication quality is more excellent than that of the currently connected wireless base station among the peripheral base stations, the handoff for switching the wireless base station to a new wireless base station is carried out.

The storage device 13 stores information or a control program necessary for the operation of the wireless communication terminal 1.

Specifically, the storage device 13 stores various kinds of information necessary for the wireless communication or the reception of the service information such as currently using service information (InuseServ) or the peripheral base station information (Neiber[i]).

Further, the wireless communication terminal 1 is provided with an input section 14, a display section 15, a call receiving section 16 and a call transmitting section 17, which serve as interfaces to a user.

The input section 14 receives an input of characters and numeric characters and an instruction of an operation to the wireless communication terminal 1. The display section 15 is controlled by the information processing section 12 and includes a liquid crystal display panel for displaying the character information, image information and the operating state (radio wave strength, a remaining quantity of a battery, time) of the wireless communication terminal 1 or the like, and a back-light for lighting the liquid crystal panel.

The call receiving section 16 converts an audio signal demodulated by the information processing section 12 to output a sound signal. The call transmitting section 17 converts the inputted sound signal to an electric signal.

In this embodiment, the radio processing section 11 and the information processing section 12 respectively serve as a transmitting and receiving section, and a control section.

Now, the peripheral base station of this embodiment of the present invention will be described below.

Figure 3:
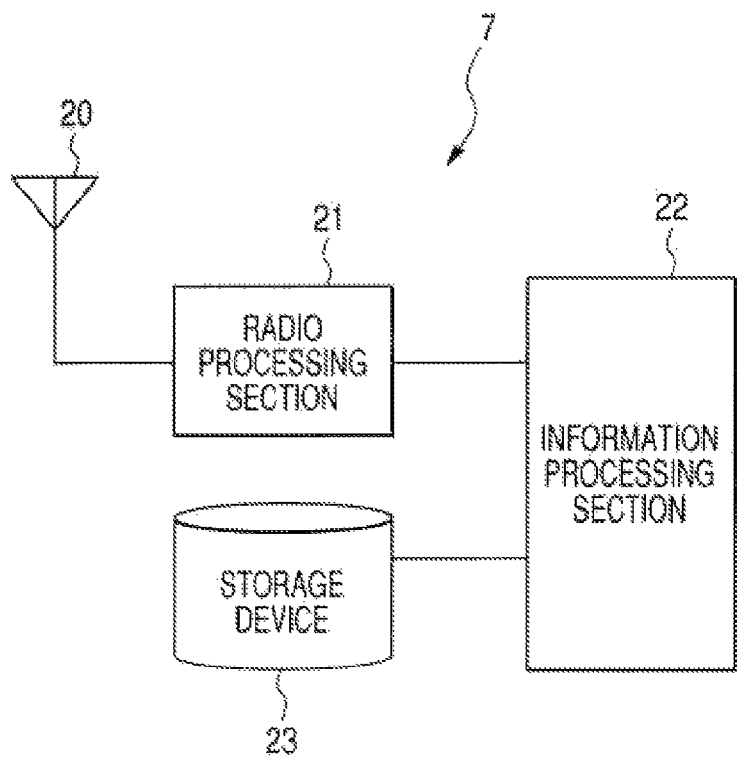
FIG. 3 is a block diagram showing a structure of a wireless base station of an embodiment of the present invention.

FIG. 3 is a block diagram showing a structure of the wireless base station 7 of this embodiment of the present invention.

The wireless base station 7 of this embodiment is compliant with broadcast data communication and multicast data communication as well as an ordinary audio communication and data communication.

An antenna 20 is connected to a radio processing section 21 to receive a radio wave from the wireless communication terminal 1 and to transmit a radio wave to the wireless communication terminal 1. The radio processing section 21 carries out transmitting and receiving processes in accordance with a CDMA 2000 1x system.

The radio processing section 21 includes a transmitting section for generating a high frequency signal transmitted from the antenna 20 and a receiving section for amplifying the high frequency signal and performing the frequency conversion to output the signal to an information processing section 22 as a base-band signal.

The information processing section 22 includes a base-band section and a radio control section. The base-band section demodulates the base-band signal to an audio signal by a codec section in the base-band section.

Further, in the codec section, the audio signal is demodulated to generate the base-band signal.

The radio control section executes a program stored in a storage device 23 to control an operation of a communication function or to process various services employing a radio communication. Specifically, the radio control section controls the transmission of data in the broadcast service and the multicast service.

Further, the radio control section controls the frequency, a transmitting and receiving timing, or the output of the transmitted radio wave, which are transmitted and received by the radio processing section 21.

Further, the radio control section controls a handoff for switching the wireless base station on the basis of communication quality information received from the wireless communication terminal 1.

The handoff includes the handoff during a call and the handoff during an idle state (idle handoff).

During the call, the wireless base station 7 receives control information transmitted by the control channel from the wireless communication terminal 1 to determine whether or not the handoff is to be performed to a neighboring wireless base station on the basis of a communication quality information included in the control information.

As a result, when the handoff is to be carried out, the wireless base station transmits an instruction to the wireless communication terminal 1 and the RAN 6A or 6B, for carrying out the handoff for switching the wireless base station to a new, wireless base station.

The storage device 23 stores information or a control program necessary for the operation of the wireless base station 7.

Specifically, the storage device 23 stores various kinds of information necessary for the service information that the base station itself is compliant with, for wireless communication of the below-described peripheral base station information or the like, and for the transmission of the service information.

In this embodiment, the radio processing section 21, the information processing section 22 and the storage device 23 respectively serve as a transmitting and receiving section, a control section, and a storing section.

Now, the peripheral base station information stored in the storage device 23 by the wireless base station 7 will be described below in detail.

FIG. 4 is an information format of the peripheral base station information of this embodiment of the present invention.

The peripheral base station information is transmitted together with notification information transmitted from the currently communicating wireless base station.

FIG. 4 shows the peripheral base station information of the CDMA 2000 1x system.

The service information (SERVICE-INCL, NGHBER-SERVICE) is added to the peripheral base station information of this embodiment, in addition to the above-described peripheral base station information of the related art (FIG. 10).

SERVICE-INCL indicates whether or not service type information (NGHBER-SERVICE) is included in the peripheral base station information.

That is, when SERVICE-INCL="1", the next field is NGHBER-SERVICE.

NGHBER-SERVICE indicates the contents of a service that can be provided by the peripheral wireless base station.

Figures 5, 6:
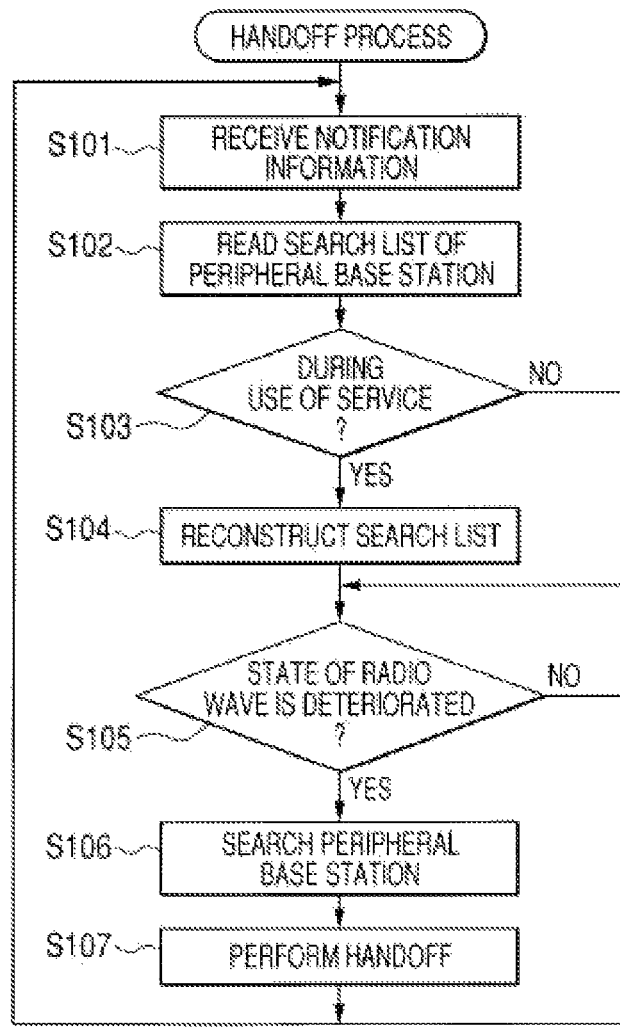
FIG. 5 shows a definition of service type information of an embodiment of the present invention.
FIG. 6 is a flowchart of a handoff process of the wireless communication terminal of an embodiment of the present invention.

FIG. 5 shows a definition of the service type information of this embodiment of the present invention.

The service type information of this embodiment is composed of 7 bits and the bits respectively indicate services provided by the wireless base station.

In an example shown in FIG. 5, a first bit shows the broadcast service, second to fourth bits respectively show the multicast services 1 to 3, and fifth to seventh bits are allocated to three kinds of services that have not been started yet though a provision of the service is reserved.

For instance, when the service type information of a certain wireless base station indicates "0000000", this shows that the wireless base station does not provide any of the services. Further, when the service type information of the certain base station indicates "0000111", the wireless base station can provide the broadcast service, the multicast service 1 and the multicast service 2.

FIG. 6 is a flowchart of a handoff process of the wireless communication terminal 1 of this embodiment of the present invention that is performed during an idle state.

Initially, the wireless communication terminal 1 receives the notification information from the wireless base station that is currently connected at each timing of measuring a radio wave state of the peripheral wireless base station (S101). The information processing section 12 extracts the peripheral base station information from the received notification information.

Then, the information processing section 12 reads a peripheral base station search list (FIG. 7) from the storage device 13 (S102).

After that, the information processing section 12 determines whether or not a specific service is currently used, and stores the service in the service information (InuseServ) of the storage device 13 (S103).

This is determined depending on whether or not an application software corresponding to the service has been activated.

That is, the type of service provided is determined on the basis of the kind of contents transmitted from the wireless base station 7.

Subsequently, the information processing section 12 reconstructs the peripheral base station search list on the basis of the service information of the peripheral wireless base station, when the specific service is currently used (S104). That is, the wireless communication terminal 1 registers the service information of the peripheral wireless base station notified from the wireless base station 7 in the peripheral base station search list.

On the other hand, when the specific service is not currently used, the information processing section 12 moves to step S105 without reconstructing the peripheral base station search list.

FIG. 7 shows the peripheral base station search list (Neiber [i] list) stored in the storage device 13 of the wireless communication terminal 1 of this embodiment of the present invention.

The peripheral base station search list is formed on the basis of the service information of the peripheral wireless base station transmitted by being included in the notification information from the currently communicating wireless base station.

"No." represents the number of a record written in the peripheral base station search list.

"PN" represents a PN offset of the peripheral wireless base station.

"Channel" represents a channel that is currently used by the peripheral wireless base station.

"Service" represents a type of the service that can be provided by the peripheral wireless base station and is written based on the definition (FIG. 5) of the above-described service type.

In the step S105, a CIR (Desired wave to Interference wave ratio) is measured to determine whether or not the state of a radio wave is deteriorated.

The state of the radio wave may also be determined by using a received signal strength (RSSI: Received Signal Strength Indicator) or an error rate of a received signal (BER: Bit Error Rate), without using the CIR.

When it is determined that the state of the radio wave is good, the handoff is not performed and the process is finished.

On the other hand, when it is determined that the state of the radio wave is deteriorated, the peripheral base station search list is referred to search a peripheral wireless base station as a candidate of the handoff (S106).

Specifically, AND of the currently used service information (InuseServ) and the peripheral base station information (Neiber[i]) is calculated to specify the wireless base station that provides a necessary service.

That is, when InuseServ and Neiber[i].service=InuseServ, the wireless base station does provide the necessary service to the wireless communication terminal 1.

On the other hand, when InuseServ and Neiber[i].service≠InuseServ, the wireless base station does not provide the necessary service to the wireless communication terminal 1.

After that, the wireless base station that provides the necessary service to the wireless communication terminal 1 is specified to measure the received electric field strength (RSSI) only of the wireless base station specified as the candidate of the handoff.

Then, a destination of the handoff is determined in accordance with the measured received electric field strength to perform the handoff to the wireless base station determined to be the destination of the handoff (S107).

For instance, when the wireless communication terminal currently uses the broadcast service, InuseServe=0000001. At this time, a wireless base station showing Neiber[i].service=******1 ("*" designates an arbitrary numeric value) can be employed as a candidate for the handoff.

When the use of the broadcast service is completed, since the service information shows InuseServ=0000000, all peripheral wireless base stations become candidates of the handoff. Thus, the received electric field strength of all the wireless base stations is measured.

In the handoff process of this embodiment, the received electric field strength of only the wireless base station that provides the service is measured.

Thus, since the received electric field strength for the wireless base station that does not provide a service employed at present is not measured by the wireless communication terminal 1, this wireless base station does not become the destination of the handoff.

In the embodiment of the present invention, the type of the service information provided by the peripheral wireless base station 7 is added within the peripheral base station information that is notified by the wireless base station 7. The wireless communication terminal 1 can therefore know the service information that the peripheral wireless base station is compliant with before the handoff is carried out. Accordingly, the interruption of the service due to the handoff can be avoided.

Further, specification is made by restricting the base stations performing the peripheral radio wave environment measurement based on the service information of the peripheral wireless base station notified by the wireless base station 7 and the contents of the service currently used by the wireless communication terminal. Therefore, a searching time of the peripheral wireless base station can be shortened, a load necessary for a process can be reduced and a consumed electric power can be reduced.

INDUSTRIAL APPLICABILITY

In the present invention, the information showing the service information provided by the peripheral base station is included in the peripheral base station information that is notified from the base station. The peripheral base station as the candidate of the handoff is selected on the basis of the notified information and the service used by the terminal.

That is, the wireless communication terminal can know the service information that the peripheral wireless base station is compliant with before the handoff is carried out. The handoff can be carried out only to the peripheral base station that is compliant with the service information. Accordingly, the interruption of the service due to the handoff can be avoided.

Further, since the peripheral base stations capable of performing the handoff are restricted, a searching time of the peripheral base station can be shortened, a load necessary for a process can be reduced and a consumed electric power can be reduced. Consequently, the industrial applicability is extremely high.

The invention claimed is:

1. A wireless communication terminal, comprising:
a receiving section for receiving service information that is broadcast to the wireless communication terminal from a base station, and receiving from the base station information of other base stations existing nearby and information including a plurality of types of broadcasting services provided by the other base stations; and
a control section for specifying a base station that provides the service information broadcasted by the base station from the other base stations based on the information including the types of broadcasting services provided by the other base stations, wherein
the types of broadcasting services include a first type of broadcasting service and a second type of broadcasting service different from the first type of broadcasting service,
the control section detects a communication quality between the wireless communication terminal and the base station and a communication quality between the wireless communication terminal and the specified base station, specifies a handoff candidate base station based on the detected result, determines whether a handoff to the base station that is specified as the handoff candidate needs to be performed, and
when the control section determines that the handoff is necessary, the control section performs the handoff to the base station that is specified as the handoff candidate.

2. The wireless communication terminal according to claim 1, wherein
the receiving section receives the service information together with identification information that identifies the service information, and
the control section specifies the base station that provides the service information broadcasted by the base station from the other base stations based on the identification information and the information including the types of broadcasting services provided by the other base stations.

3. The wireless communication terminal according to claim 1, wherein the control section detects only a communication quality between the wireless communication terminal and the base station that is specified to provide the service information.

4. A wireless communication terminal according to claim 1, wherein the control section determines a candidate base station to which hand off is carried out based on the information including the types of broadcasting services provided by the other base stations.

5. The wireless communication terminal according to claim 1, wherein the first type of broadcasting service is a broadcast and the second type of broadcasting service is a multicast.

6. A communication method in a communication system including a base station and a wireless communication terminal for transmitting and receiving data with the base station through a radio communication network, wherein
the base station broadcasts service information to the wireless communication terminal,
the wireless communication terminal receives the service information,
the base station transmits information of at least one other base station existing nearby the base station and information including a plurality of types of broadcasting services provided by the other base station, to the wireless communication terminal,
the wireless communication terminal receives the information including the types of broadcasting services provided by the other base station together with the information of the other base station while continuously receiving the service information, and specifies a base station that provides the receiving service information broadcasted by the base station from the other base station based on the received information including the types of broadcasting services provided by the other base station,
the types of broadcasting services include a first type of broadcasting service and a second type of broadcasting service different from the first type of broadcasting service,
the wireless communication terminal detects a communication quality between the wireless communication terminal and the base station and detects a communication quality between the wireless communication terminal and the specified base station,
the wireless communication terminal specifies a handoff candidate base station based on the detected result,
the wireless communication terminal determines whether a handoff to the specified base station needs to be performed, and
the wireless communication terminal performs the handoff to the specified base station when it is determined that the handoff is necessary.

7. The communication method according to claim 6, wherein the wireless communication terminal determines a candidate base station to which hand off is carried out based on the information including the types of broadcasting services provided by the other base station.

8. The communication method according to claim 6, wherein the first type of broadcasting service is a broadcast and the second type of broadcasting service is a multicast.

9. A computer readable medium having a program that allows a wireless communication terminal that includes a transmitting and receiving section for transmitting and receiving data with a base station through a radio communication network and a control section for controlling the transmission and reception of the data by the transmitting and receiving section, to perform instructions comprising:
receiving service information that is broadcast to the wireless communication terminal from the base station;
receiving information of other base stations existing nearby the base station and information including a plurality of types of broadcasting services provided by the other base stations, which are transmitted by the base station, while receiving the service information;
specifying a base station that provides the service information broadcasted by the base station from the other base stations based on the received information including the types of broadcasting services provided by the other base stations, wherein the types of broadcasting services include a first type of broadcasting service and a second type of broadcasting service different from the first type of broadcasting service;
detecting a communication quality between the wireless communication terminal and the base station and a communication quality between the wireless communication terminal and the specified base station;
specifying a handoff candidate base station based on the detected result;
determining whether a handoff to the specified base station needs to be performed; and
performing the handoff to the specified base station when it is determined that the handoff is necessary.

10. The computer readable medium having the program that allows the wireless communication terminal to perform the instructions according to claim 9, wherein
the service information is received together with identification information that identifies the service information from a plurality of service information; and
the base station that provides the service information is specified from the other base stations based on the identification information and the information including the types of broadcasting services provided by the other base stations.

11. The computer readable medium having the program that allows the wireless communication terminal to perform the instructions according to claim 9, the instructions further comprising:
detecting only a communication quality between the wireless communication terminal and the base station that is specified to provide the service information.

12. The computer readable medium of claim 9, further allows the wireless communication terminal to perform instructions comprising:
determining a candidate base station to which hand off is carried out based on the information including the types of broadcasting services provided by the other base stations.

13. The computer readable medium according to claim 9, wherein the first type of broadcasting service is a broadcast and the second type of broadcasting service is a multicast.

14. A wireless communication terminal, comprising:
a receiving section for receiving service information that is broadcast to the wireless communication terminal from a base station, and receiving from the base station information of other base stations existing nearby and information including a plurality of types of broadcasting services provided by the other base stations; and
a control section for specifying a base station that provides the service information broadcasted by the base station from the other base stations based on the information including the types of broadcasting services provided by the other base stations, wherein
the types of broadcasting services include a first type of broadcasting service and a second type of broadcasting service different from the first type of broadcasting service, and
the control section detects only a communication quality between the wireless communication terminal and the base station that is specified to provide the service information.

15. A communication method in a communication system including a base station and a wireless communication terminal for transmitting and receiving data with the base station through a radio communication network, wherein
the base station broadcasts service information to the wireless communication terminal,
the wireless communication terminal receives the service information,
the base station transmits information of at least one other base station existing nearby the base station and information including a plurality of types of broadcasting services provided by the other base station, to the wireless communication terminal,
the wireless communication terminal receives the information including the types of broadcasting services provided by the other base station together with the information of the other base station while continuously receiving the service information, and specifies a base station that provides the receiving service information broadcasted by the base station from the other base station based on the received information including the types of broadcasting services provided by the other base station,
the types of broadcasting services include a first type of broadcasting service and a second type of broadcasting service different from the first type of broadcasting service, and
the wireless communication terminal detects only a communication quality between the wireless communication terminal and the base station that is specified to provide the service information.

16. A computer readable medium having a program that allows a wireless communication terminal that includes a transmitting and receiving section for transmitting and receiving data with a base station through a radio communication network and a control section for controlling the transmission and reception of the data by the transmitting and receiving section, to perform instructions comprising:
receiving service information that is broadcast to the wireless communication terminal from the base station;
receiving information of other base stations existing nearby the base station and information including a plurality of types of broadcasting services provided by the other base stations, which are transmitted by the base station, while receiving the service information;
specifying a base station that provides the service information broadcasted by the base station from the other base stations based on the received information including the types of broadcasting services provided by the other base stations, wherein the types of broadcasting services include a first type of broadcasting service and a second type of broadcasting service different from the first type of broadcasting service; and
detecting only a communication quality between the wireless communication terminal and the base station that is specified to provide the service information.

* * * * *